March 9, 1971 R. P. CANALE 3,568,440
TURBINE ENGINE FUEL CONTROL
Filed Dec. 23, 1968
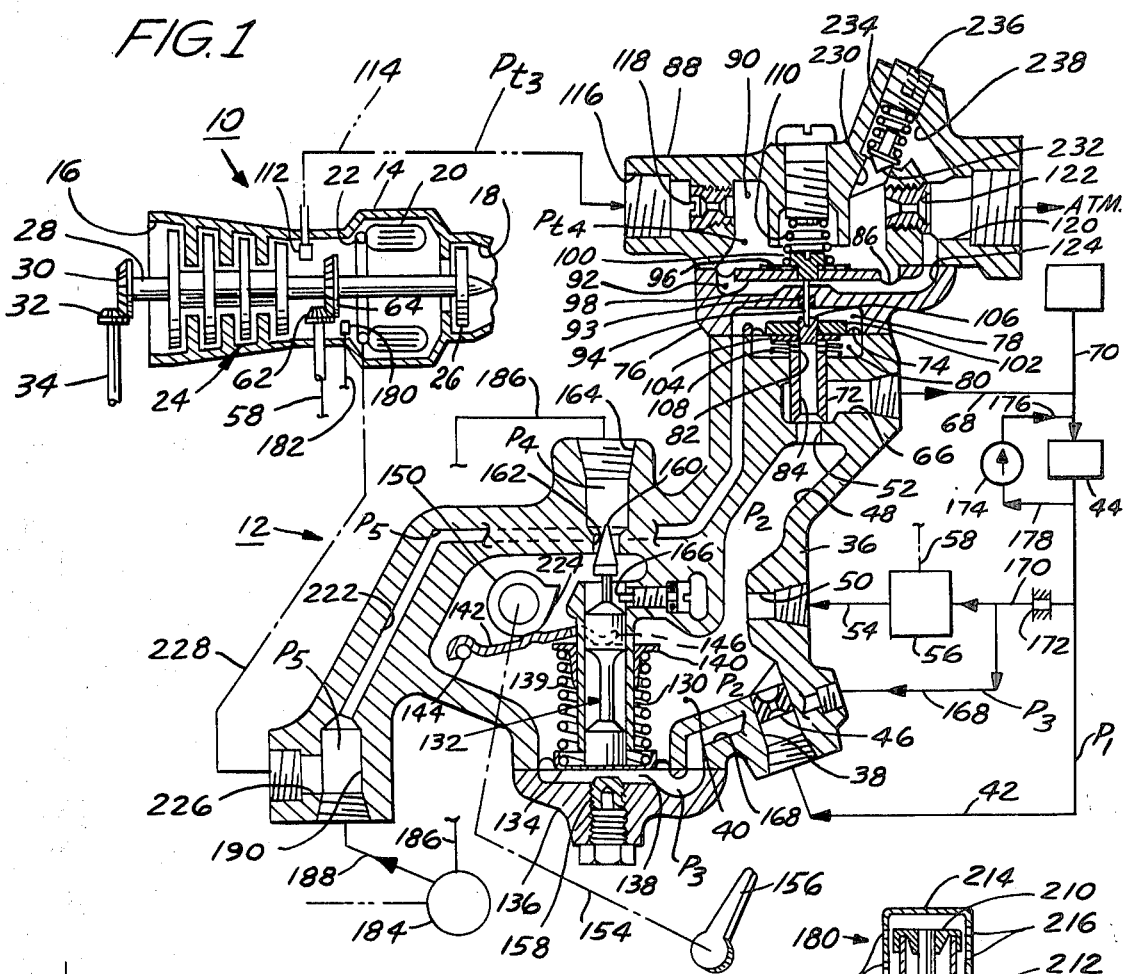
FIG. 1
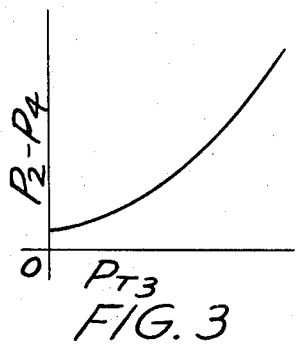
FIG. 3
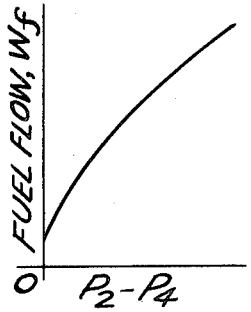
FIG. 4
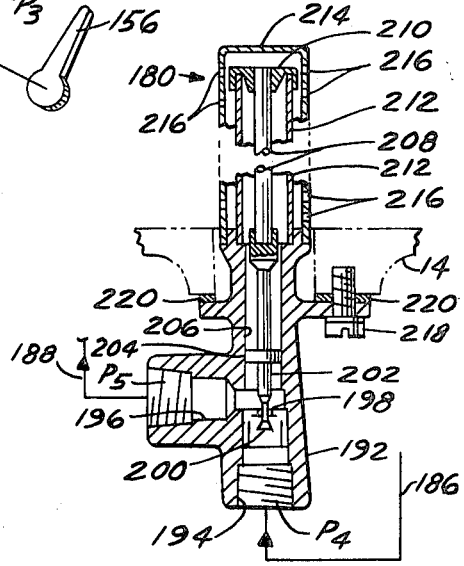
FIG. 2
FIG. 5
RAYMOND P. CANALE
INVENTOR.
BY Walter Patarcka, Jr.
ATTORNEY United States Patent Office 3,568,440
Patented Mar. 9, 1971

3,568,440
TURBINE ENGINE FUEL CONTROL
Raymond P. Canale, Warren, Mich., assignor to
Holley Carburetor Company, Warren, Mich.
Continuation-in-part of application Ser. No. 747,366,
July 24, 1968. This application Dec. 23, 1968, Ser.
No. 786,321
Int. Cl. F02c 9/10
U.S. Cl. 60—39.28          8 Claims

ABSTRACT OF THE DISCLOSURE

A turbine engine fuel control is provided with a fuel inlet, metering-type governor valve assembly responsive to signals generated in response to engine speed and indicia of operator power request, fuel bypass valving means for returning unmetered fuel from the fuel control to an associated fuel supply system, compressor discharge pressure sensing means for tending to further close the bypass valving means as compressor discharge pressure increases and pressure responsive means responsive to the differential in pressures which meter the fuel for opening said bypass valving means in order to achieve a rate of metered fuel flow corresponding to compressor discharge pressure.

RELATED APPLICATION

This application is a continuation-in-part of my co-pending application Ser. No. 747,366 filed on July 24, 1968, for "Turbine Engine Fuel Control."

BACKGROUND OF THE INVENTION

Gas turbine engines may be classified broadly into three groups such as (1) turbojet, (2) turboprop and (3) turboprop and (3) turboshaft. The turbojet engine is one which relies upon jet thrust to develop its propulsive force, whereas, a turboprop has its turbine shaft coupled to a propeller, as well as to the compressor, so as to develop its propulsive force by slightly increasing the velocity of a large mass of air. The turboshaft engine differs from the turboprop in that the turbine shaft is coupled to an output shaft which drives something other than a propeller. This output shaft may, for example, be a drive shaft for a land based vehicle such as a truck, or a stationary power plant.

Each of these engines, although identical in many basic concepts, in the past required different types of fuel controls. That is, the fuel controls were often required to include specific components which were uniquely suited for sensing and responding to single operating parameters in order to, in turn, contribute to the total control of the fuel metering function.

Further, in the past, fuel controls which were to have a fuel metering schedule which provided for a substantially linear metered fuel flow with respect to compressor discharge pressure usually required complicated and costly valves, linkages and levers.

SUMMARY OF THE INVENTION

According to the invention, in a turbine engine fuel control having a housing with a fuel inlet and a metered fuel outlet formed therein and containing a variably positionable governor valve means for metering fuel to said metered fuel outlet generally in accordance with a pressure differential created thereacross during periods of steady state operation of said engine, an acceleration system for controlling the rate of fuel flow to said engine during periods of operation wherein said engine is undergoing conditions of engine acceleration comprises bypass conduit means adapted for communication with an area of relatively low pressure, bypass valve means for at times completing communication between said bypass conduit means and the unmetered fuel within said housing as supplied thereto by said fuel inlet, said bypass valve means being effective to prevent communication between said bypass conduit means and said unmetered fuel within said housing during at least certain times of steady state engine operation, movable pressure responsive means, means for conveying the discharge pressure of the compressor of said engine to said pressure responsive means in order to make said pressure responsive means responsive thereto, and slidable force transmitting means operatively abuttingly interconnecting said bypass valve means and said pressure responsive means, said pressure responsive means being effective during period of engine acceleration to apply a force to said bypass valve means through said force transmitting means in a direction tending to maintain said bypass valve means closed and thereby preclude communication between said bypass conduit means and said unmetered fuel within said housing.

Accordingly, it is now proposed to provide a fuel control of a concept which can be readily adapted to a turboprop, turboshaft or turbojet engine without the necessity of any major rework with the possible exception of minor changes in the constants and calibration of the system.

Another main object of this invention is to provide, for a turbine engine, a fuel control which is capable of metering a substantially linear schedule of fuel flow with respect to compressor discharge pressure without the necessity of including therein complicated and costly components for either sensing or reacting to operating control parameters.

A further object of this invention is to provide within a fuel control a main metering valve across which a pressure differential is created and which pressure is applied to a fuel bypass valve for at times opening the bypass valve when governed engine operation is experienced.

Other more specific objects and advantages of this invention will become apparent when reference is made to the following description considered in conjunction with the drawings.

DESCRIPTION OF THE DRAWINGS

In the accompanying drawings, wherein certain details may be omitted for purposes of clarity;

FIG. 1 is a schematic illustration in cross-section of a fuel control embodying the invention as might be employed with a schematically typical solid shaft turbine engine which might be of either the turbojet or turboshaft variety;

FIG. 2 is an enlarged cross-sectional view of certain elements schematically illustrated in FIG. 1; and FIGS. 3, 4 and 5 are graphs illustrating characteristic performance relationships of various operating control parameters.

DESCRIPTION OF PREFERRED EMBODIMENT

Referring now in greater detail to the drawings, FIG. 1 illustrates a turbine engine 10 whose fuel supply is controlled by the scheduling type of fuel control 12 embodying the invention. The engine 10 has a housing 14 with an air intake 16 and exhaust nozzle 18. A combustion or burner chamber 20 having a fuel distribution ring 22 herein, is located within the housing 14 between the compressor 24 and turbine 26. Power plant 10 is of the "solid shaft" type which has its compressor 24 connected as by a solid shaft to all of the turbine wheels or turbine wheel 26. The output power of such an arrangement as shown by engine 10 may be achieved by a pure jet output, as is often the case in aircraft applications, or, for example, by a mechanical transmission as schematically depicted by shaft 28, gears 30, 32 ant output shaft 34. Turbine engine 10, of course, could be employed as a land-based stationary power plant, one employed in combination with either a land or water vehicle, as well as being employed as an aircraft power plant.

The fuel control 12, having a housing 36, is illustrated as comprising a fuel inlet conduit 38 which communicates generally between a general cavity or chamber 40 within housing 36 and a fuel supply conduit 42 communicating with a fuel pump 44. Inlet conduit 38, is provided with a restriction 46 for purpose of which will become apparent as the description progresses.

Cavity or chamber 40 communicates with a passageway 48 which, in turn, communicates with conduits 50 and 52. Conduit 50 communicates, as by conduit means 54, with speed sense means 56 operatively connected as by suitable motion transmission means 58 to the shaft 60 as by means of meshed gears 62 and 64 of which 64 is connected to the shaft 60 and compressor 24 for rotation therewith.

Conduit 52 is in controlled communication with a bypass conduit 66 leading, as by suitable conduit means 68, to conduit means 70 upstream of the fuel pump 44. A bypass valve 72 operatively connected to a pressure responsive diaphragm assembly 74 is, as will become evident, normally urged downwardly toward a position closing communication between conduits 52 and 66. Diaphragm assembly 74 may be suitably retained between housing 36 and housing portion 76 so as to form two generally distinct but variable chambers 78 and 80. As will be noted, bypass valve 72 is provided with a plurality of radial passages 82 which continually complete communication between the interior 84 of bypass valve 72 and chamber 80.

A second diaphragm assembly 86 suitably secured between first housing portion 76 and a second housing portion 88, so as to form two generally distinct but variable chambers 90 and 92, is operatively connected to a motion transmitting pushrod 94 which is slidably received through a wall of housing portion 76 so as to have its opposite ends generally received within chambers 92 and 78.

As can be seen in FIG. 1, the diaphragm assembly 86 includes oppositely disposed diaphragm backing plates 96 and 98 which may be secured to each other, as to contain the diaphragm therebetween, by a suitable fastener 100 passing therethrough. Similarly, diaphragm assembly 74 may be provided with oppositely disposed diaphragm backing plates 102 and 104 which also may be secured to each other, as to contain the diaphragm therebetween, by a suitable fastener 106, which may be formed at one end of valve 72, passing therethrough. If desired, fastener 106 may be provided with a bore for receiving therein one end of pushrod 94. A compression spring 108, situated within chamber 80 normally resiliently urges the diaphragm assembly 74 upwardly while a compression spring 110 within chamber 90 resiliently urges the diaphragm assembly 86 downwardly thereby causing the pushrod 94 to be in abutting engagement at one end with the diaphragm assembly 74 and valve 72 and, at the other end, with diaphragm assembly 86. (As specifically illustrated, the motion or force transmitting pushrod 94 may actually abut against the fastener portions 100 and 106 of diaphragm assemblies 86 and 74, respectively.)

Burner inlet pressure, $P_{t3}$, sensed as by a probe 112 is directed to chamber 90 as by conduit means 114 and 116 and a restriction 118 in series therewith. Chamber 90, containing compression spring 110, normally urging diaphragm assembly 86 downwardly, communicates with the ambient atmosphere by means of a conduit 120 which also contains a restriction 122. Because of the flow afforded by the combination of restrictions 118 and 122 the pressure, $P_{t4}$, within chamber 90, although related to the value of $P_{t3}$, will be of a value somewhat less than the value of $P_{t3}$. Chamber 92 communicates with the ambient atmosphere as by means of a conduit 124 which communicates with conduit 120 downstream of restriction 122.

Chamber or cavity 40 has a cylindrical valve-guide portion 130 for slidably receiving therein a governor valve 132 suitably secured as at one end to a third pressure responsive diaphragm assembly 134 which may be suitably secured between housing 36 and cover member 136 in a manner forming a chamber 138 between the diaphragm assembly 134 and cover 136. A flanged sleeve-like variably positioned spring seat 140 is situated generally about the cylindrical valve-guide 130 in a manner so as to contain a compression spring 139 between seat 140 and diaphragm assembly 134. A lever 142, generally hinged as at 144, has a bifurcated end 146 which is adapted to straddle guide 130 in order to engage the upper surface of spring seat 140. Intermediate the ends thereof, lever 142 is provided with a cam-follower portion 148 adapted to engage the cam surface of a cam member 150 mounted on a shaft 152 for rotation therewith. As diagrammatically illustrated at 154, shaft 152 is operatively connected to a power selector lever 156 so that, for example, clockwise rotation of power lever 156 will cause corresponding rotation of shaft 152 and cam 150 thereby rotating lever 142 clockwise about pivot 144 in order to urge spring seat 140 downwardly thereby increasing the loading of compression spring 139. Such loading of spring 139, of course, urges diaphragm assembly 134 and governor valve 132, connected thereto, in the downward direction. A threadably adjustable stop 158 may be provided for limiting the degree of downward movement of diaphragm assembly 134 and governor valve 132.

Governor valve 132 is provided with a valving portion 160 which is adapted to cooperate with an orifice 162 in order to control the rate of fuel flow from chamber 40 to a conduit 164. As is apparent, the higher that valve 132 is positioned, the less flow there will be through orifice 162 for the same pressure differential. An adjustably positioned eccentric stop member 166 may be provided in order to provide a positive limit for the upward movement of governor valve 132.

Chamber 138, on the other side of diaphragm assembly 134, communicates as by a conduit 168 with a conduit 170 which communicates generally between speed sense 56 and fuel supply conduit 42. As will be noted, conduit 170 contains a restriction 172 and conduit 168 communicates with conduit 170 at a point downstream of restriction 172.

The purpose of speed sense 56, in the embodiment disclosed, is to provide a pressure signal indicative of the speed of the gas producer section (compressor 24 and compressor drive turbine). One embodiment of the invention was successfully tested and operated employing a speed sense functionally equivalent to the speed sense as shown, for example, at "140" in U.S. Pat. 3,073,115 issued Jan. 15, 1963, to Warren H. Cowles et al. In such an arrangement, restriction 172 would be functionally equivalent to the restriction shown at "242" of said U.S. Patent 3,073,115. Such arrangements and their operations are at this time generally well known in the art. It might also be pointed out at this time that pump 44 is provided with either an externally or internally formed pressure relief and check valve assembly as shown at 174 with suitable associated conduitry 176 and 178 communicating with valve 174 and respectively with conduits 70 and 42.

As shown in FIGS. 1 and 2, means may be provided for enabling the employment of another control parameter, that being the parameter of burner inlet temperature, for further qualifying the metered fuel flow to the engine. As schematically illustrated in FIG. 1, a temperature probe 180 is situated generally upstream of the burner section 20 so as to sense the temperature of the air of that point in order to further tailor the fuel requirements in accordance therewith. The temperature probe 180 is operatively connected by suitable motion transmitting means, as schematically illustrated at 182, to a valve assembly 184 which is serially connected between conduit 186, leading from conduit 164, and conduit 188 leading to conduit 190. Generally, the valve assembly 184 functions in a manner whereby a reduction in flow through the valve assembly 184 is experienced as probe 180 senses an increase in temperature.

FIG. 2 illustrates in greater detail one embodiment of a probe 180 and valve assembly 184 suitable for use in the arrangement of FIG. 1. Valve assembly 184 is illustrated as being comprised of a housing 192 having an inlet conduit 194 and an outlet conduit 196 generally between which is situated a valve orifice and seat 198. A valve member 200, carried as at the end of a stem portion 202, is situated so as to vary the effective area of orifice 198 depending on the relative proximity of the valve member 200. Stem 202, provided with a shoulder-like pilot portion 204 slidably received within a cylindrical guide-way 206 formed in housing 192, has its opposite end operatively secured to one end of a temperature sensing rod 208. The other end of rod 208 is secured to an end cap member 210 which cooperates with a recessed portion of housing 192 to axially contain therebetween a second temperature sensing member 212 of cylindrical configuration. Cylinder 212 and rod 208 have different coefficients of thermal expansion resulting in a predictable axial movement of valve member 200 per degree of temperature variation. The temperature probe 180 is also preferably provided with a protective shroud 214, which is perforated as at 216, in order to protect the rod 208 and cylinder 212 from possible damage. The entire assembly may be secured to the housing 14 of engine 10 by any suitable means such as the fastener and seal respectively illustrated at 218 and 220.

OPERATION

Fuel at a pressure P, is supplied by pump 44 through conduit 42 to conduit 38 and through muscles restriction 46 situated within conduit 38. An accompanying drop in pressure across restriction 46 results in the fuel within chamber 40 being at same pressure $P_2$ which is less than $P_1$. Further, it can be seen that conduit 168 supplies fuel from conduit 170 to chamber 138 at a pressure $P_3$ which is usually less than pressure $P_1$. However, it should be apparent that as the speed sense 56 senses greater speeds, the throttling valve contained therein becomes more nearly closed, resulting in the differential pressure $P_3-P_2$ increasing in magnitude. The ultimate maximum value of pressure $P_3$ would, of course, be pressure $P_1$ upstream of restriction 172. A further pressure drop occurs with the passage of fuel through the aperture defined by orifice 162 and metering 160, so that metered fuel downstream of orifice 162 is at a pressure $P_4$. A second pressure drop occurs with the passage of fuel through the aperture defined by orifice 198 and valve 200 so that the metered fuel downstream of orifice 198 is at a pressure P. An inspection of of FIG. 1 will disclose that a pressure differential of $P_2-P_5$ exists across the metering orifice 162 and temperature modulated orifice 198 and that the same pressure differential of $P_2-P_5$ exists across the diaphragm assembly 74. (Pressure $P_5$ is communicated to chamber 78 by suitable conduit means 222 in communication with conduit 190.) In other words, the force tending to open the bypass valve 72 is directly related to the pressure differential across the governor metering restriction and temperature modifying valve 184.

Further, it can be seen that a pressure differential of $P_3-P_2$ exists across pressure responsive diaphragm assembly 134. Accordingly, as pressure differential $P_3-P_2$ increases and approaches the value of $P_1-P_2$, as, for example, by the increased rotational speed of speed sense 56, a force is created across diaphragm assembly 134 tending to move governor valve 132 upwardly toward a more nearly fully closed position.

When the engine is being made ready for cranking, the power selector lever 156 is rotated to the desired power setting causing rotation of shaft 152 which, in turn, rotates cam 150 clockwise. Such rotation of cam 150 causes the contoured surface 224 to engage follower 148 and progressively urge lever 142 clockwise about pivot 144 thereby increasing the loading on spring 139 so as to urge diaphragm assembly 134 and governor valve 132 downwardly to provide a maximum effective flow area through orifice 162. As the engine 10 is being cranked, fuel pump 44 provides a supply of fuel through conduit 42 to chamber 40 at a pressure $P_2$, which increases in magnitude as the pump speed increases, so as to flow through orifice 162, conduits 164, 186 and 190. A conduit 226, formed in housing 36 effectively places conduit 190 in communication, as through suitable conduit means 228, with the fuel distribution ring 22. At this early stage of engine cranking or starting, the fuel pressure $P_2$ will be sufficient to cause diaphragm assembly 74 to move upwardly against the force transmitted by pushrod 94 thereby modulating the pressure differential of $P_2-P_5$.

Once ignition is achieved, the engine compressor 24 and turbine 26 begin to accelerate to achieve the speed and/or power requested by the position of the power selector lever 156. As a consequence of the increase in speed, fuel flow from pump 44 is increased with attendant increases in pressures $P_1$, $P_2$ and $P_3$ within supply conduit 42 and chambers 40 and 138 respectively.

Accordingly, it can be seen that the pressure differential of $P_3-P_2$ is increasing across diaphragm assembly 134 tending to overcome the force of spring 139 so as to urge governor valve 132 upwardly while, at the same time, the pressure differential $P_2-P_5$, which is also increasing, is being applied across diaphragm assembly 74 tending to move bypass valve 72 upward in the opening direction.

Generally, compressor discharge pressure, $P_{t3}$, varies as the square of the speed of the compressor 24; the speed signal $P_3$, varies as the square of the speed being sensed; and the weight-rate of fuel flow, $W_f$, through orifice 162 varies as the square root of the pressure differential $P_2-P_4$. It should also be pointed out that the flow-through system established by restrictions 118 and 122 permits the changing of pressure $P_{t4}$ from having a characteristic of varying as the square of the speed of the compressor to a lesser relationship, as, for example, approximating the square root of the compressor discharge pressure, $P_{t3}$, permitting the ultimate relationship of fuel flow, $W_f$, varying linearly with respect to compressor discharge pressure, $P_{t3}$. This can be expressed by the equation:

$$W_f = KA\sqrt{P_2-P_4}$$

where:

K = a constant
A = cross-sectional flow area of orifice 162 as determined by valving portion 160

Further, this is graphically illustrated by FIGS. 3, 4 and 5, which, respectively, illustrate the relationship between the differential pressure $P_2-P_4$ ($\Delta P_1$) and compressor discharge pressure, $P_{t3}$; metered fuel flow, $W_f$, and differential pressure $\Delta P_1$; and metered fuel flow, $W_f$, and compressor discharge pressure $P_{t3}$.

As engine speed (compressor speed) increases, pressure within respective chambers 90, 80, 40 and 138 also increases in accordance with the parameters governing such pressures. Accordingly, it can be seen that as compressor speed is increasing, speed sense differential pressure $P_3-P_2$ causes the gradual upward movement of governor valve 132 when the force of spring 139 is overcome, thereby reducing the effective cross-sectional area of orifice 162. Due to the decreased cross-sectional area of orifice 162, the pressure differential $P_2-P_4$ (and therefore the pressure differential $P_2-P_5$) tends to increase, causing a greater upward force to be applied to bypass valve diaphragm assembly 74. Accordingly, when the differential $P_2-P_5$ ($\Delta P_2$) increases to a predetermined value (for the conditions established) the resulting upward force on diaphragm assembly 74 equals and then to a slight degree exceeds the force transmitted by pushrod 94 so as to open bypass valve 72 in order to bypass fuel from chamber 40 and conduit 48 through conduit 52 to the inlet side of the fuel pump 44 as by conduit means 66, 68 and 70. Bypass valve 72 will be moved toward and away from the closed position in order to maintain the particular pressure differential $\Delta P_2$, so as to keep the engine operating at the governed steady state condition.

If it is now assumed that it is desired to increase the output of the engine from some first point of steady state operation to a second point of steady state operation, the only thing that needs to be done is to rotate the power selector lever 156 further to the right in order to cause an additional incremental clockwise rotation of shaft 152 and cam 150 so as to have the cam surface 224 further depress end 146 of lever 142. This, in turn, causes a greater loading on spring 139 and diaphragm assembly 134 to the point that the force created by pressure differential $P_3-P_2$ or $\Delta P_3$ is overcome thereby moving governor valve 132 downwardly increasing the effective flow area of orifice 162.

As a consequence, increased fuel flow to the engine is achieved resulting increases in the compressor speed, compressor discharge pressure, $P_{t3}$, compressor pressure, $P_{t4}$, and speed sense differential pressure $P_3-P_2$. The increase in $P_{t4}$, and speed sense differential pressure $P_3-P_2$. The increase in $P_{t4}$ causes diaphragm assembly 86 to exert a further force on pushrod 94 against diaphragm assembly 74 so as to tend to close the bypass valve 72 and maintain $\Delta P_1$ in proportion to $P_{t4}$. Accordingly, as before, when pressure differential $P_3-P_2$ increases sufficiently, governor valve 132 is moved upwardly an amount sufficient to meter the desired weight rate of fuel flow and bypass valve 72 is moved upwardly so as to maintain the desired $\Delta P_1$ across the metering orifice 162.

For a controlled deceleration, the power selector lever 156 is rotated to a lower counterclockwise position thereby permitting end 146 of lever 142 to move to its uppermost position. This reduces the load on spring 139 and permits $P_3-P_2$ to move governor valve 132 to its uppermost position so as to, for example, engage the minimum fuel flow abutment or stop 166.

In view of the preceeding, it should also be apparent that speed sense 56 provides an overrun protection. That is, if for some reason the load, as experienced by shaft 34, was suddenly removed, the engine would tend to overspeed and depending on the magnitude of the lost load, such overspeed could be critical. Accordingly, it can be seen that any such tendency to overspeed is sensed by speed sense 56, which, in turn, creates a related increase in the differential pressure $P_3-P_2$ so as to move the governor valve upwardly thereby reducing the fuel flow so as to prevent an otherwise uncontrolled overspeed. Further, it should be apparent that the temperature probe 180 and associated valving assembly 184 function to define an area wherein a family of generally linear fuel-flow-to-compressor-discharge-pressure schedule will exist depending upon the then particular temperature sensed by the probe 180.

The acceleration system, comprised generally of bypass valve 72, diaphragm assemblies 74, 86, pushrod 94 and restrictions 118, 122 provides an arrangement where only very slight movements are necessary in order to control the opening and closing of the bypass valve 72. It can be seen that the force created by $P_{t4}$ acting on diaphragm assembly 86 is transmitted to the bypass valve 72 by the solid pushrod or force transmitting member 94. Since bypass valve motion is very slight, total motion of diaphragm assembly 86 is relatively insignificant and therefore friction effects on the pushrod 94, as by the seal 93, are negligible.

It will be noted, in FIG. 1, that chamber 90, within housing portion 88, has a first branch conduit 230, in communication therewith, with a resiliently biased valve member 232 seated against and closing the other end of conduit 230. Spring 234 may be adjustably preloaded by the adjustable spring seat 236. As can be seen, when a predetermined value of $P_{t4}$ is attained (or exceeded) valve 232 is moved off its cooperating seat thereby venting such excess pressure through conduit 230 and conduit 238 to conduit 120 at a point downstream of restriction 122. Accordingly, it can be seen that a maximum value of $P_2-P_5$, and therefore fuel flow, for a given temperature as sensed by probe 180, is limited or determined by the relief valve 232 preloaded to open at a desired value of $P_{t4}$.

Although only one preferred embodiment of the invention has been disclosed and described it is apparent that other embodiments and modifications of the invention are possible within the scope of the appended claims.

I claim:

1. In a turbine engine fuel control having a housing with a fuel inlet and a metered fuel outlet formed therein and containing a variably positionable governor valve means for metering fuel to said metered fuel outlet generally in accordance with a pressure differential created signal proportional to engine speed during periods of steady state operation of said engine, an acceleration system for controlling the rate of fuel flow to said engine during periods of operation wherein said engine is undergoing conditions of engine acceleration, said acceleration system comprising bypass conduit means adapted for communication with an area of relatively low pressure, bypass valve means for at times completing communication between said bypass conduit means and the unmetered fuel within said housing as supplied thereto by said fuel inlet, said bypass valve means being effective to prevent communication between said bypass conduit means and said unmetered fuel within said housing during certain periods of engine operation, movable pressure responsive means, means for conveying the discharge pressure of the compressor of said engine to said pressure responsive means in order to make said pressure responsive means responsive thereto, and slidable force transmitting means operatively interconnecting said bypass valve means and said pressure responsive means, said pressure responsive means being effective during periods of engine acceleration to apply a force to said bypass valve means through said force transmitting means in a direction tending to maintain said bypass valve means closed and thereby preclude communication between said bypass conduit means and said unmetered fuel within said house, said means for conveying the discharge pressure comprising a chamber, a first conduit portion effective for communicating between a source of said compressor discharge pressure and said chamber, a second conduit portion effective for communicating between said chamber and a source of atmospheric pressure, a first restriction within said first conduit portion, and a second restriction in said second conduit portion, said first and second restrictions being calibrated such that said pressure in said chamber has a value less than and proportional to approximately the square of the value of said compressor discharge pressure, said above-recited elements being selected such that said compressor discharge pressure squared acts upon said by-pass valve responsive means to maintain a pressure differential proportional to compressor discharge pressure squared across said governor valve, said governor valve being in a fixed fully opened position during engine acceleration, thereby resulting in a linear relationship of fuel flow to compressor discharge pressure, since fuel flow through the fixed area of said governor valve is proportional to the square root of the pressure differential thereacross.

2. A turbine engine fuel control according to claim 1 wherein said pressure responsive means comprises diaphragm assembly means including movable abutment means carried thereby for engaging said force transmitting means.

3. A turbine engine fuel control according to claim 1 wherein said bypass valve means comprises second pressure responsive means acted upon said pressure differential, said pressure differential being effective to urge movement of said bypass valve means in a direction to establish communication between said bypass conduit means and said unmetered fuel.

4. A turbine engine fuel control according to claim 1 wherein said pressure responsive means comprises diaphragm assembly means including movable abutment means carried thereby for engaging said force transmitting means, wherein said bypass valve means comprises second pressure responsive means acted upon by said pressure differential, said second pressure responsive means comprising second diaphragm assembly means including second movable abutment means carried thereby for also engaging said force transmitting means.

5. A turbine engine fuel control according to claim 1 wherein said means for conveying the discharge pressure includes a portion adapted to communicate between said chamber and said source of atmospheric pressure, and pressure responsive valve means responsive to the pressure within said chamber for terminating the communication through said third conduit portion whenever the pressure within said chamber is less than a predetermined value.

6. A turbine engine fuel control according to claim 1 wherein said means for conveying the discharge pressure includes said chamber operatively engaging and urging said movable pressure responsive means in a direction toward said bypass valve means, and third conduit means in parallel with said second restriction means, said third conduit means including resiliently biased pressure relief valve means effective for terminating communication through said third conduit means whenever the pressure within said chamber is less than a predetermined value.

7. A turbine engine fuel control according to claim 1 including a housing wall portion, a second chamber formed generally between one side of said wall portion and said pressure responsive means, wherein said chamber means for conveying the discharge pressure is located on a side of said pressure responsive means opposite to said second chamber, third conduit means in parallel with said second restriction means, said third conduit means including resiliently biased pressure relief valve means effective for terminating communication through said third conduit means whenever the pressure within said second chamber is less than a predetermined value, fourth conduit means communicating between said second chamber and said source of atmospheric pressure, wherein said bypass valve means comprises second pressure responsive means, axially movable valve means secured to said second pressure responsive means, a third chamber formed between an other side of said wall portion and said second pressure responsive means, fifth conduit means communicating between said third chamber and a source of metered fuel downstream of said governor valve means, a fourth chamber formed on the other side of said second pressure responsive means, sixth conduit means communicating between said fourth chamber and a source of unmetered fuel upstream of said governor valve means, and force transmitting means passing through and axially slidable within said wall portion, said force transmitting means extending at its opposite ends into said second and third chambers so as to abutably engage both of said pressure responsive means.

8. A turbine engine fuel control according to claim 1 including a housing wall portion, a second chamber formed generally between one side of said wall portion and said pressure responsive means, wherein said means for conveying the discharge pressure is located on a side of said pressure responsive means opposite to said second chamber, third conduit means communicating between said second chamber and said source of atmospheric pressure, wherein said bypass valve means comprises second pressure responsive means, axially movable valve means secured to said second pressure responsive means, a third chamber formed between an other side of said wall portion and said second pressure responsive means, fourth conduit means communicating between said third chamber and a source of metered fuel downstream of said governor valve means, a fourth chamber formed on the other side of said second pressure responsive means, fifth conduit means communicating between said fourth chamber and a source of unmetered fuel upstream of said governor valve means, and force transmitting means passing through and axially slidable within said wall portion, said force transmitting means extending at its opposite ends into said second and third chambers so as to abutably engage both of said pressure responsive means.

References Cited
UNITED STATES PATENTS

| | | | |
|---|---|---|---|
| 2,649,686 | 8/1953 | Lawrence | 60—39.28 |
| 3,048,012 | 8/1962 | Slatter | 60—39.28 |
| 3,183,667 | 5/1965 | Chadwick | 60—39.28 |
| 3,241,315 | 3/1966 | Cowles | 60—39.28 |
| 3,243,957 | 4/1966 | Mansfield | 60—39.28 |
| 3,283,503 | 11/1966 | Cowles | 60—39.28 |
| 3,307,351 | 3/1967 | Wheeler | 60—39.28 |

FOREIGN PATENTS

| | | | |
|---|---|---|---|
| 753,305 | 7/1956 | Great British | 60—39.28 |

MARK M. NEWMAN, Primary Examiner